March 15, 1955          J. HUEY          2,704,149
SKIRT BOARDS FOR TRANSFER POINT BETWEEN CONVEYOR BELTS
Filed March 12, 1952.          2 Sheets-Sheet 1
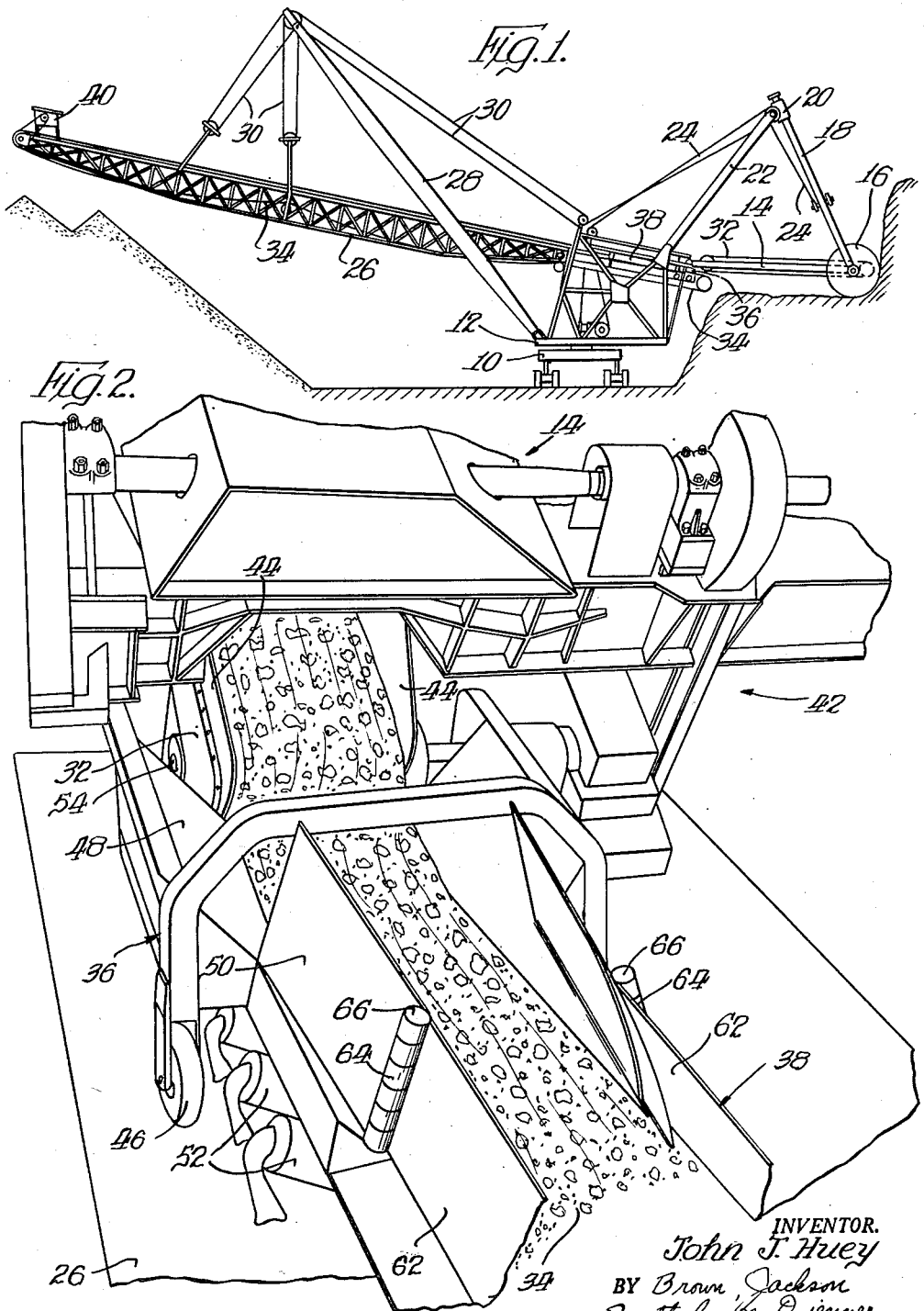
INVENTOR.
John J. Huey
BY Brown, Jackson,
Boettcher & Dienner
Attys March 15, 1955 J. HUEY 2,704,149
SKIRT BOARDS FOR TRANSFER POINT BETWEEN CONVEYOR BELTS
Filed March 12, 1952 2 Sheets-Sheet 2

INVENTOR.
John T. Huey
BY Brown, Jackson,
Boettcher & Dienner
Attys.

United States Patent Office 2,704,149
Patented Mar. 15, 1955

2,704,149

SKIRT BOARDS FOR TRANSFER POINT BETWEEN CONVEYOR BELTS

John Huey, Chicago, Ill., assignor to The United Electric Coal Companies, Chicago, Ill., a corporation of Delaware Application March 12, 1952, Serial No. 276,131

11 Claims. (Cl. 198—89)

The present invention relates to side or skirt boards for conveyor belts and particularly to flexible or extensible skirt boards for the transfer point between conveyor belts that are bodily movable with respect to one another.

The provision of stationary side or skirt boards for conveyor belts to maintain materials on the belts is known. Likewise, the provision of stationary side or skirt boards for each of two stationarily supported belts and for the material transfer point therebetween is known. However, if the two belts are bodily movable with respect to one another, the provision of skirt boards at the transfer point becomes a problem. In other words, if the end of the first belt is movable relatively to the surface of the second belt, to which material is to be transferred, so that the transfer point between the belts may be changed, it will be apparent that conventional stationary skirt boards fixed to both belt supporting structures cannot be used. Heretofore, it has been the practice in such instances to fixedly secure stationary skirt boards to the end of the supporting structure of the first belt so that the skirt boards extend beyond the free end of the first belt towards the second belt and are movable, with the first belt, so as to be continuously disposed at the transfer point between the belts. Skirt boards of this type have proven generally unsatisfactory for the reason that the freely extending end portions of the boards yield or become bent and do not accurately guide and maintain the material on the second belt. Furthermore, the extent or length of the skirt boards is definitely limited due to the mounting thereof so that same do not encompass a sufficient length of the second belt to insure accurate alignment and retention of the material on the second belt. This is particularly pronounced where the second belt is not provided with skirt boards or is concave so as not to require conventional skirt boards.

An object of the present invention is to provide improved skirt boards for the transfer point between two conveyor belts that are bodily movable with respect to one another.

Another object of the invention is to provide flexible or extensible skirt boards for the transfer point between two conveyor belts that are bodily movable with respect to one another.

In particular, it is an object of the present invention to provide improved skirt boards for the transfer point between two relatively movable conveyor belts wherein the skirt boards are affixed at one end to the supporting structure of one of the belts and at the opposite end to the supporting structure of the other belt and are adapted to extend and contract in accordance with the relative movement between the belts so as always to be disposed between the two belts at the transfer point therebetween.

The present invention, in a preferred embodiment thereof, comprises a skirt board formed of a continuous sheet or roll of metal or other suitable material supported in a roll on the supporting structure of one of the belts and connected at its free end to the supporting structure of the other belt, and means for maintaining a winding force on the roll, so that as the belts move toward and away from one another the skirt board winds onto or off the roll and is continuously maintained in a taut position between the two belts. Accordingly, it will be appreciated that the boards will be continuously maintained at the transfer point between the two belts and may be of any length required to properly guide and maintain the material on the belt to which it is transferred.

In use, the present invention is not limited in application, but does have particular adaptability to earth moving and excavating machinery, in connection with which the present invention will be described in detail hereinafter.

Other objects and advantages of the present invention will become apparent in the following detailed description of a preferred embodiment of the invention, wherein reference is made to the accompanying drawings, in which:

Figure 1 is a view in side elevation of an excavating machine of the character referred to;

Figure 2 is a perspective view, on an enlarged scale, of the transfer point between two conveyor belts of the machine shown in Figure 1, partially showing the skirt boards of the present invention.

Figure 3:
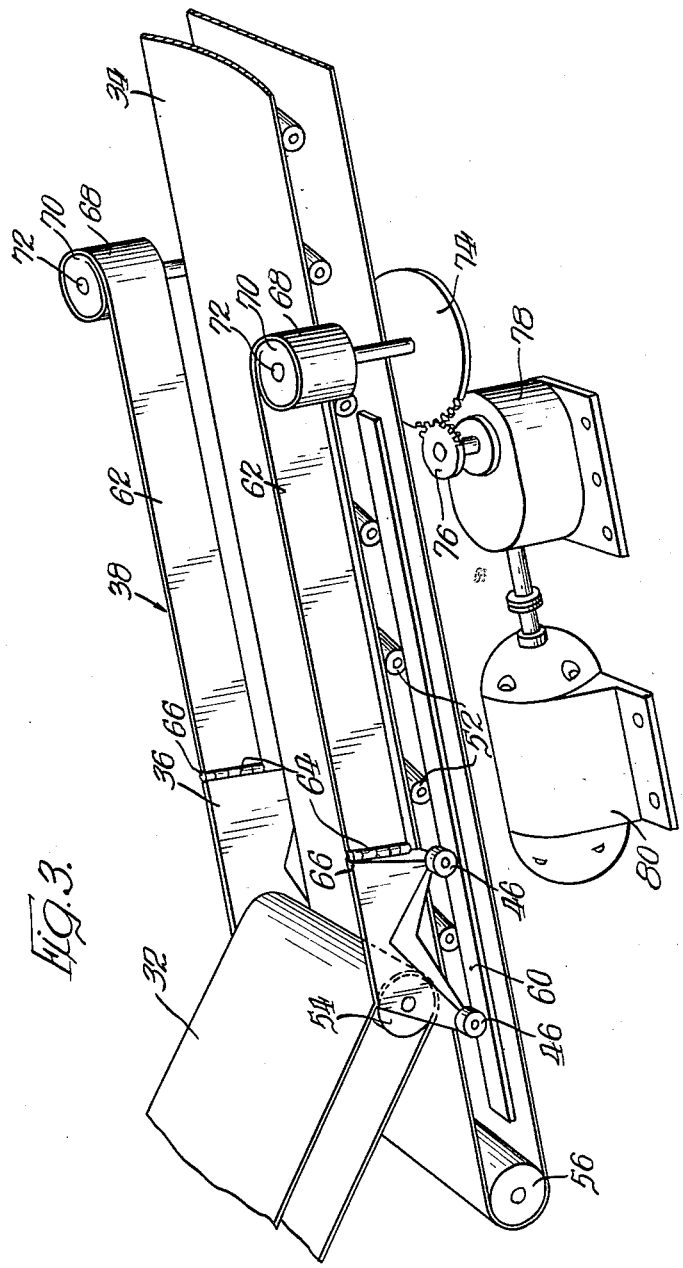
Figure 3 is a partial perspective view of two conveyor belts adapted for movement with respect to one another and the skirt boards of the present invention associated therewith.

Referring now to the drawings, and particularly to Figure 1, an excavating machine or apparatus of the type with which the present invention is particularly adapted for use is shown as comprising a movable platform or tractor 10 supporting a frame 12 mounted for rotation on the platform 10. The frame 12 carries a digging ladder 14 which at its free outer end is adapted for the support of a digging wheel 16 mounted for rotation thereon. The digging ladder 14 and the digging wheel 16 are supported and guided for movement by a wish bone 18. A saddle block 20 connects the wish bone 18 to a supporting mast 22 carried by the frame 12. The digging ladder 14, the wish bone 18 and the mast 22 have a plurality of cables 24 associated therewith for effecting control and movement of the digging wheel 16.

At its opposite side, the frame 12 carries a stacker ladder 26 supported by a mast 28 and a plurality of suspension and hoist lines 30. The digging ladder 14 comprises a supporting structure for a conveyor belt 32 adapted for the reception of materials excavated by the digging wheel 16. The conveyor belt 32 is adapted to carry the materials rearwardly on the upper run thereof toward the frame 12. The stacker ladder 26 comprises a supporting structure for a conveyor belt 34 having a portion at the forward end thereof projecting beneath the rearward portion of the conveyor belt 32. Accordingly, materials carried rearwardly by the conveyor belt 32 are transferred thereby onto the upper run of the conveyor belt 34. The conveyor belt 34 carries the material rearwardly thereon to a suitable point of disposal.

As will be appreciated, the digging ladder 14 and the stacker ladder 26 are adapted for movement with respect to one another to provide for suitable actuation of the digging wheel 16 while the rearward end of the stacker ladder 26 is maintained at a suitable point of disposal. Accordingly, the conveyor belts 32 and 34 are adapted for movement with respect to one another but are each so associated with the frame 12 that the rearward end of the conveyor belt 32 is always disposed adjacent and above the upper run of the conveyor belt 34. To provide for effective transfer of materials between the two conveyor belts, a movable hopper or cart 36 is secured to the rearward end of the digging ladder 14 and is adapted for movement along the stacker ladder 26 to provide a guide for the transfer of materials between the two belts. To provide a further guide for the transfer of materials between the two belts, the present invention provides flexible or extensible skirt boards, indicated generally at 38. The conveyor belt 32 is adapted to be driven in a conventional manner by a motor disposed adjacent the rearward end thereof and the conveyor belt 34 is adapted to be driven by a motor 40 disposed adjacent the rearward end of the stacker ladder.

Referring now to Figure 2, the transfer point between the conveyor belts 32 and 34 is shown in greater detail. The end frame portion of the digging ladder or supporting structure 14 is indicated generally at 42 and stationary skirt boards disposed adjacent the delivery end of the conveyor 32 are indicated at 44. The hopper 36 is fixed to the end frame portion 42 of the digging ladder 14 and is provided with wheels 46 adapted for movement along the stacker ladder 26 so that the hopper 36 is connected to the digging ladder 14 and is supported on the stacker ladder 26. The hopper 36 comprises, generally, a hopper portion 48 and a skirt board portion 50.

In conventional excavating apparatus of the character briefly described, the stacker ladder conveyor belt 34 is preferably supported by a plurality of inclined rollers 52 forming a concave load bearing or carrying surface of the belt so that conventional stationary skirt boards need not be provided. In conventional constructions wherein the flexible or extensible skirt boards 38 of the present invention are not provided, the material carried by the digging ladder conveyor belt 32 is delivered into the hopper portion 48 of the hopper 36 and is guided thereby onto the stacker ladder conveyor belt 34. The skirt board portion 50 of the hopper 36 guides the material during the original portion of its travel on the conveyor belt 34 so that the material will not flow laterally off to the conveyor belt and will be aligned thereon so as to be carried rearwardly by the belt. It will be appreciated, however, that the length of the skirt board portion 50 of the hopper 36 is definitely limited in view of the fact that the skirt boards can be supported only at the end thereof adjacent the hopper. Accordingly, the skirt boards 50 cannot project a sufficient distance along the length of the conveyor belt 34 to guide and maintain the materials on the belt. As a result, considerable difficulty has arisen in conventional structures due to the tendency of the material to flow laterally off of the stacker ladder conveyor belt. As pointed out hereinbefore, it is an object of the present invention to provide skirt boards for this transfer point so that the difficulties of the conventional structures are overcome.

Referring now to Figure 3, the skirt boards of the present invention are shown in detail as associated with the conveyor belt 32 adapted to deliver material to the conveyor belt 34 through the hopper 36. The conveyor belt 32 is rotatably supported at one end thereof by means of an end roller 54 and the conveyor belt 34 is supported at the end thereof projecting beneath the conveyor belt 32 by means of an end roller 56. The digging ladder or other suitable supporting structure for the conveyor belt 34 preferably includes a pair of rails 60 or the like disposed to opposite sides of the conveyor belt 34 on which the wheels 46 of the hopper 36 may run. The hopper 36 may be suitably associated with the supporting structure for the conveyor belt 32 in any conventional manner, such as shown in Figure 3, wherein the hopper 36 is connected to the axle of the end roller 54 of the belt 32.

The flexible skirt boards of the present invention preferably comprise a pair of elongate continuous sheets 62 disposed to opposite sides of the conveyor belt 34. The sheets 62 may be formed of any suitable flexible material, but are preferably formed of thin steel sheet stock so as to be resistant to wear and readily flexible. The sheets 62 suitably may be secured to the outer end of the hopper 36. Preferably, the connection between the sheets 62 and the hopper 36 is pivotal such as may be accomplished by providing hinge sections 64 on the hopper 36 and the end of the sheets 62 and by extending a pintle pin 66 through the hinge sections 64. At their opposite ends, the continuous sheets 62 are each wound into a roll 68 about a drum 70. Preferably, the ends of the sheets 62 are secured to the surface of the drums 70 in any conventional manner and the sheets are then wound upon the drums. The drums 70 are preferably each secured to a shaft 72 suitably journaled in and rotatably supported by the stacker ladder 26 of the excavating apparatus. If desired, the shaft 72 may be omitted and the drum 70 may be suitably rotatably supported on the supporting structure for the conveyor belt 34 in any conventional manner, or the drum 70 may be omitted and the sheet 62 wound directly onto the shaft 72. However, the relationship shown in the drawings is preferred.

From the foregoing, it will be appreciated that as the conveyor belt 32 is moved away from the drums 70, the continuous sheets 62 will unwind so as to accommodate the relative movement between the two conveyor belts. To accommodate movement in the opposite direction and to maintain the continuous sheets or side boards 62 in a taut condition, suitable means are provided for continuously maintaining a winding torque or force upon the shafts 72 supporting the drums 70 and the sheets 62.

In operation, the conveyor belts 32 and 34 may be bodily moved with respect to one another and the continuous skirt boards or sheets 62 will be maintained in a taut condition to either side of the conveyor belt 34 so as to maintain materials transferred thereto on the belt and to align and guide such materials to such extent that skirt boards need not be required for a major portion of the belt. In design, the two belts are adapted for a predetermined degree or extent of relative movement and the skirt boards are designed of a length equal to or slightly greater than the degree of predetermined movement between the two belts. Accordingly, the shafts 72 supporting the rolls of sheet material will be disposed outside of or beyond the path of movement of the hopper 36 and the sheets 62 will be adapted to be extended to the full degree of movement of the hopper away from the shafts.

From the foregoing, it will be appreciated that the present invention provides extensible and retractable skirt boards adapted for association with the delivery end of a conveyor belt that is adapted for movement with respect to the conveyor belt on which the side or skirt boards of the present invention are supported. Due to the disposition of the flexible or extensible and retractable skirt boards, the conveyor belt 32 may be adapted for movement angularly of the conveyor belt 34 in addition to movement axially thereof and the skirt boards 38 will provide for proper delivery of material from the belt 32 to the belt 34. This particular relationship is especially enhanced by the provision of the hopper 36, which may be associated with the supporting structure of the belt 32 in a manner to accommodate angular movement thereof with respect to the belt 34, or which may be laterally movable with the supporting structure of the belt 32, in which case the pivotal connection between the skirt boards 38 and the hopper 36 will accommodate such movement. If separate means be provided for maintaining a winding torque or force on each of the rolls of sheet material, angular movement of the hopper 36 will be readily accommodated.

The means for maintaining the winding torque on the shafts 72 may take any suitable form. For example, the means may suitably comprise torsion springs or the like. Torsion springs, however, suffer the disadvantage that the torque exertion thereof varies depending upon the degree to which the springs are wound. In accordance with the present invention, it is preferred that a substantially uniform and constant winding force be exerted upon the rolls 68 of sheet material. Preferably, the shafts 72 each carry a gear 74 meshing within a pinion 76 operatively connected through a gear box 78 to a motor 80. The motors 80 are preferably electric slip motors provided with a reduced voltage on the armatures thereof to prevent burning the motor out when same is stalled or is being operated in a reverse direction due to the disposition or actuation of the skirt boards 62. If desired, however, the gear box 78 may include a friction clutch or the gear 74 and pinion 76 may be substituted for by suitable friction discs or the like for maintaining a constant winding force on the shafts 72 from the motor 80. The motor 80 is adjusted to provide a desired tautness in the skirt boards 62 in all positions thereof. If desired, a single motor unit may be provided for actuating both shafts 72.

From the foregoing, it will be appreciated that the present invention provides extensible and contractable skirt boards for the transfer point between two conveyor belts that are adapted for bodily movement with respect to one another. The skirt boards provide for the accurate alignment and guidance of materials transferred to the second belt, the belt 34, and are continuously maintained at a desired tautness so as to effectively accomplish their intended function at all times.

While I have described what I regard to be a preferred embodiment of my invention, it will be apparent that various changes, rearrangements and modifications may be made therein without departing from the scope of the invention, as defined by the appended claims.

I claim:

1. In combination with two relatively movable conveyor belts having a transfer point therebetween and each having a supporting structure, the improvement comprising a sheet supported in a roll on the supporting structure of one of the belts and having its free end connected to the supporting structure of the other belt, said sheet being unwound from and wound upon the roll as a transfer point between the two belts is changed.

2. In combination with two relatively movable conveyor belts having a transfer point therebetween and each having a supporting structure, the improvement comprising a sheet supported in a roll on the supporting structure of one of the belts and having its free end connected to the supporting structure of the other belt, and means maintaining a winding force on the roll.

3. In combination, two relatively movable conveyor belts having a transfer point therebetween and each having a supporting structure, a sheet suported in a roll on the supporting structure of one of the belts and having its free end connected to the supporting structure of the other belt, and means for maintaining a constantly uniform winding force on the roll.

4. In combination, two relatively movable conveyor belts having a transfer point therebetween and each having a supporting structure, a sheet supported in a roll on the supporting structure of one of the belts and having its free end connected to the supporting structure of the other belt, a drum on which said roll is wound, said drum being supported for rotation on the supporting structure of said one belt, and means for maintaining a constant and uniform torque on said drum.

5. In combination, two relatively movable conveyor belts having a transfer point therebetween and each having a supporting structure, a shaft journaled on the supporting structure of one belt, a sheet rolled on said shaft, said sheet being connected at its free end to the supporting structure of the other belt, and a motor operatively connected to said shaft for maintaining a uniform rotational force thereon to constantly tend to wind said sheet on said shaft.

6. In combination, a pair of relatively movable conveyor belts having a transfer point therebetween and each having a supporting structure, a shaft journaled on the supporting structure of one belt, a drum secured to said shaft, a sheet rolled on said drum and connected at one end thereto, said sheet being connected at its free end to the supporting structure of the other belt adjacent the transfer point, a gear secured to said shaft, a pinion meshing with said gear, and a motor operatively connected to said pinion for maintaining a uniform rotational force thereon to constantly tend to wind said sheet on said drum.

7. In a conveying system, a first conveyor belt, a supporting structure for said first belt, a second conveyor belt having a load bearing surface disposed adjacent one end of said first belt, a supporting structure for said second belt, said supporting structures being movable with respect to one another to move said one end of said first belt along the load bearing surface of said second belt, skirt boards for the transfer point between said belts disposed to either side of said belts, each of said skirt boards comprising a sheet supported in a roll on the supporting structure of said second belt and connected at its free end to the supporting structure of said first belt adjacent said one end thereof, and means for maintaining a winding force on said rolls.

8. In a conveying system, a first conveyor belt, a supporting structure for said first belt, a second conveyor belt having a load bearing surface disposed adjacent one end of said first belt, a supporting structure for said second belt, said supporting structures being movable with respect to one another to move said one end of said first belt along the load bearing surface of said second belt, a hopper connected to the supporting structure of said first belt adjacent said one end thereof and movable along the supporting structure of said second belt, skirt boards disposed to either side of said second belt, each of said skirt boards comprising a sheet supported in a roll on the supporting structure of said second belt and connected at its free end to said hopper, and means for maintaining a winding force on said rolls.

9. In a conveying system, a first conveyor belt, a supporting structure for said first belt, a second conveyor belt having a load bearing surface disposed adjacent one end of said first belt, a supporting structure for said second belt, said supporting structures being movable with respect to one another to move said one end of said first belt along the load bearing surface of said second belt, a hopper connected to the supporting structure of said first belt adjacent said one end thereof, said first belt delivering into said hopper, said hopper straddling said second belt and being movable along the supporting structure of said second belt, and skirt boards disposed to either side of said second belt, each of said skirt boards comprising a sheet supported in a roll on the supporting structure of said second belt and connected at its free end to said hopper, a drum supported for rotation on the supporting structure of said second belt to one side of said belt, said sheet being wound on and connected at its other end to said drum, and a motor operatively connected to said drum for maintaining a uniform winding force on said drum.

10. In a conveying system as set forth in claim 9, said connections between the free ends of said sheets and said hopper being pivotal connections.

11. For use in a conveyor system including a pair of relatively movable conveyor belts having a transfer point therebetween and each having a supporting structure, a skirt board for the transfer point comprising an expansible and contractible sheet adapted to be supported in a roll on the supporting structure of one belt and being adapted to have its free end connected to the supporting structure of the other belt, and motive means adapted to maintain a constant and uniform winding force on the roll.

References Cited in the file of this patent

UNITED STATES PATENTS

| 929,619 | Michener | July 27, 1909 |
| 2,491,255 | Edwards | Dec. 13, 1949 |
| 2,492,159 | Lehman | Dec. 27, 1949 |
| 2,542,451 | Anderson | Feb. 20, 1951 |

FOREIGN PATENTS

| 591,798 | Great Britain | Aug. 28, 1947 |